United States Patent [19]

Simon et al.

[11] Patent Number: 4,934,992
[45] Date of Patent: Jun. 19, 1990

[54] POWER TRANSMISSION BELTS

[75] Inventors: Jean-Michel Simon, Clamart; Victor Zarifé, Saint-Germain Des Pres, both of France

[73] Assignee: Hutchinson, Paris, France

[21] Appl. No.: 283,063

[22] Filed: Dec. 7, 1988

[30] Foreign Application Priority Data

Dec. 8, 1987 [FR] France .................. 87 17039

[51] Int. Cl.⁵ ............................... F16G 1/04
[52] U.S. Cl. ................................... 474/268
[58] Field of Search ........ 474/263, 201, 265, 268–271; 156/137–142; 428/102, 245, 246, 284, 286

[56] References Cited

U.S. PATENT DOCUMENTS

| 4,493,681 | 1/1985 | Takano | 474/268 |
| 4,741,726 | 5/1988 | Zarifé et al. | 474/268 |
| 4,786,273 | 11/1988 | Guskov et al. | 474/268 |
| 4,799,919 | 1/1989 | Kozachevsky et al. | 474/268 X |

FOREIGN PATENT DOCUMENTS 0084702 8/1983 European Pat. Off. .
0222637 5/1987 Fed. Rep. of Germany .
1033794 8/1983 U.S.S.R. .

OTHER PUBLICATIONS

Patent Abstracts of Japan, vol. 10, No. 304 (M–526)[2360], Oct. 16, 1986; and JP-A-61-116149 (Daido Kogyo Co., Ltd.) 03-06-1986.

*Primary Examiner*—Thuy M. Bui
*Attorney, Agent, or Firm*—Browdy & Neimark

[57] ABSTRACT

A power transmission toothed trapezoidal belt comprising a body constituted by an elastomer matrix having a layer of metal cables or of natural or synthetic material textile cords embedded therein for the purpose of providing strength in traction, and also having reinforcing members embedded therein extending substantially transversely relative to the belt, each reinforcing member having a cross-section which is substantially "open" in shape, being somewhat trough- or gutter-shaped, wherein said reinforcing members (21; 32; 33; 35; 36; 41; 51) are individual reinforcing members which are independent from one another, and wherein said reinforcing members are received in the gaps (20) between the teeth of the belt.

12 Claims, 1 Drawing Sheet

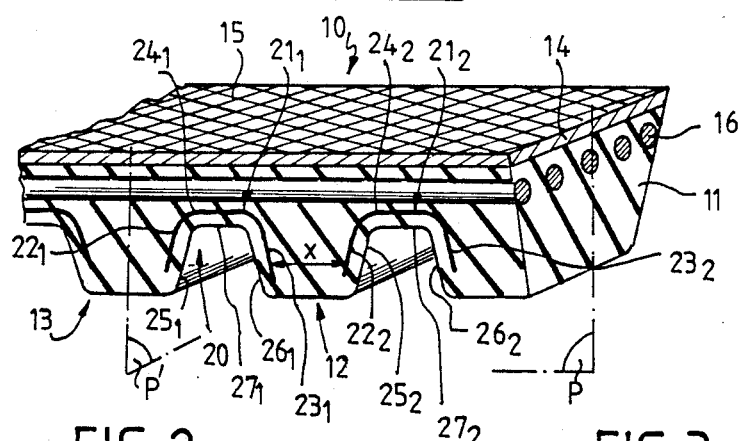
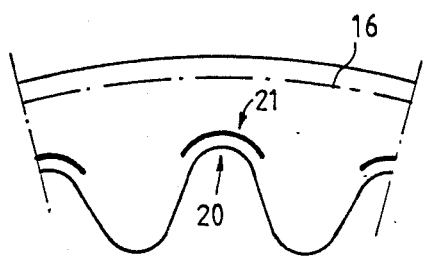
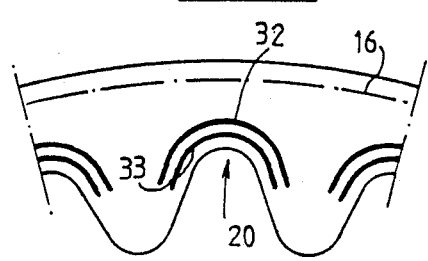
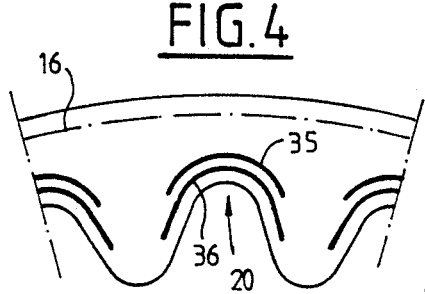
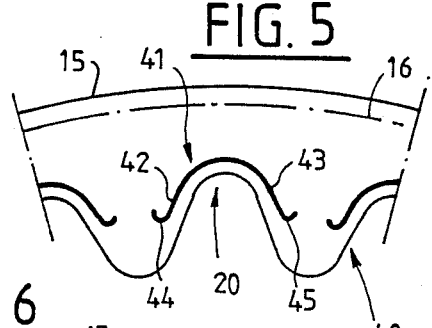
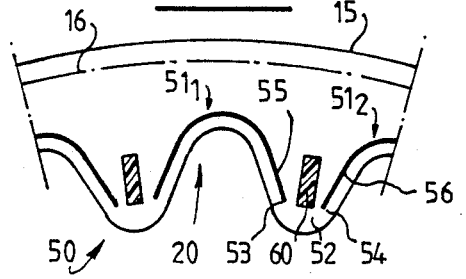

POWER TRANSMISSION BELTS

The invention relates to improvements in power transmission belts.

It relates, in particular, to improvements in bare-sided toothed trapezoidal belts suitable for being used as power transmission members between two rotary members, one of which is fixed to a driving shaft and the other of which is fixed to a driven shaft.

BACKGROUND OF THE INVENTION

When such belts are used for transmitting high power, proposals have already been made to increase their transverse stiffness by inserting reinforcement in the teeth, said reinforcement extending across the belt. Such proposals can be seen, for example, in SU-A-1 033 794, or EP-A-0 084 702, or in EP-A-0-222 637 in the name of the present Assignee. SU-A-1 033 794 describes a toothed belt in which a metal strip is embedded in the resilient matrix constituting the belt for the purpose of reducing vibration and noise, said strip being shaped by stamping in order to present pairs of lugs which are disposed to correspond with the teeth of the belt. The lugs are kept in place and held by hollow transverse inserts which are received in the teeth between adjacent lugs, thereby considerably reducing longitudinal flexibility and consequently giving rise to rapid damage in operation by loss of cohesion at the interfaces between the inserts and the resilient matrix, in spite of adhesion means being provided to ensure said cohesion.

Although belts as described in EP-A-0 222 637 in which reinforcement is received in the teeth extending substantially transversely relative to the belt, said reinforcement being generally "open" in cross section rather like guttering, do indeed give satisfaction, it would nevertheless be desirable to further improve the characteristics of such belts in particular with reference to their flexibility so that they can be passed around the small-diameter pulleys with which they may need to co-operate.

Thus, a general object of the present invention is to provide an improved power transmitting toothed trapezoidal belt which has excellent winding deformation characteristics, including characteristics enabling it to wind about small-diameter pulleys with which it may be required to co-operate, and which also has teeth having excellent stability in the radial plane while enabling high power to be transmitted, i.e. while having the required transverse stiffness without thereby preventing it from having longitudinal flexibility.

Another object of the invention is to provide such a belt having an operating lifetime which is as long as, if not longer than, the lifetime provided by prior art belts, and which also avoids the drawbacks of some prior art belts in which transverse stiffness is obtained by means of inserts provided in the teeth of the belt.

SUMMARY OF THE INVENTION

The present invention provides a power transmission toothed trapezoidal belt comprising a body constituted by an elastomer matrix having a layer of metal cables or of natural or synthetic material textile cords embedded therein for the purpose of providing strength in traction, and also having reinforcing members embedded therein extending substantially transversely relative to the belt, each reinforcing member having a cross-section which is substantially "open" in shape, being somewhat trough- or gutter-shaped, wherein said reinforcing members are individual reinforcing members which are independent from one another, and wherein said reinforcing members are received in the gaps between the teeth of the belt.

This results firstly in good stability of the teeth in a transverse plane, and secondly in improved operating qualities, probably due to the fact that the center of gravity disposed in the radial plane of the belt is moved closer to the neutral axis in traction close to the cable reinforcements contained therein, although the invention should not be taken as being bound by this possible explanation.

In a first embodiment, the reinforcing members may be made of metal, or they may be based on synthetic resin itself either including reinforcement or not including reinforcement, or they may be in the form of various laminates, and in any event each reinforcing member is placed in a gap between two teeth of the belt and curves around a single fold, with the flanks of the reinforcing member being directed substantially parallel to the flanks of the teeth.

In another embodiment, the invention provides for associating each gap between the teeth of the belt not with one, but with a plurality of reinforcing folds each having substantially the same length and all being disposed substantially parallel to one another with their flanks following the contour of the teeth to a greater or a lesser extent, thereby imparting a somewhat anticlinal aspect to the right cross-section of the belt. Such a disposition further increases the transverse stiffness of the belt without spoiling its longitudinal flexibility.

In a variant embodiment, the reinforcing members are also disposed in each of the gaps between the teeth in the form of superposed folds, but are of different lengths.

In yet another embodiment, each tooth of the belt receives an insert located more precisely in the vicinity of and between the ends of the reinforcing members lining two adjacent gaps, said insert being likewise directed transversely relative to the belt and contributing further to increasing the stability of the teeth in the radial plane by reducing the thickness of the elastomer in the tooth in which it is received.

The reinforcing members mentioned above may be metal, e.g. made of stainless steel, of aluminum, of aluminum alloy, of copper alloy, etc., or they may be constituted by substances based on resin and natural and/or synthetic fibers, or else they may be constituted by composite materials comprising a plurality of sheets which are held together in the form of laminates based on natural and/or synthetic fiber cloth, elastomer, metal sheets, etc. . . . . .

Said reinforcing members may have free edges which are unshaped, or else in a variant their edges may be rolled over or partially folded over or curved inwardly or outwardly relative to the "open" shape along which they extend.

BRIEF DESCRIPTION OF THE DRAWINGS

Embodiments of the invention are described by way of example with reference to the accompanying drawing, in which:

FIG. 1 is a diagrammatic perspective view of a portion of an improved belt in accordance with the invention; and FIGS. 2 to 6 are fragmentary diagrammatic elevation views of various different embodiments of toothed belts in accordance with the invention.

MORE DETAILED DESCRIPTION

As shown in FIG. 1, belt 10 in accordance with the invention comprises a matrix 11 of elastomer material such as polychloroprene (neoprene), nitrile rubber, styrene-butadene rubber (SBR), etc. . . . having a trapezoidal right cross-section with bare flanks and having its inside face 12 cut out to form teeth 13, and having an outside face 14 which may be lined with one or more layers of rubberized cloth 15, e.g. based on neoprene coated cotton, with the inside face 12 also being lined, where appropriate, with rubberized cloth analogous to the cloth 15.

A layer of cords 16 are embedded in the matrix 11 and serve to provide strength in traction, said cords may be made of metal wires, e.g. steel wires, or else they may be made of threads of synthetic material such as threads of glass, of polyester, or of aramid, e.g. of Kevlar (registered trademark of Du Pont de Nemours).

In each of the gaps or spaces 20 between the teeth, there is a reinforcing member 21 constituted by an elongate member whose right cross-section is "open" so as to be substantially "trough-" or "gutter-" shaped, said member being made of metal, of synthetic material, or of composite material, with each reinforcing member being independent from the others and being disposed in the same way in each of the gaps $20_1$, $20_2$, . . . , etc. between the teeth of the belt.

More precisely, each reinforcing member $21_1$, $21_2$, . . . , etc. has a curved section with flanks $22_1$ & $23_1$; $22_2$ & $23_2$; . . . , etc. interconnected by respective arches $24_1$, $24_2$, . . . , etc. each defining a cross-section fold which is similar to that of the corresponding gap 20, thereby enabling said reinforcing members 21 to be placed in said gaps so that their flanks 22 and 23 run substantially parallel to the side faces $25_1$ & $26_1$; $25_2$ & $26_2$; etc. of the respective teeth of the belt, with said reinforcing members extending over a major portion of the height of each tooth, and with the arches $24_1$, $24_2$, . . . , etc. of the reinforcing members running substantially parallel to the bottoms $27_1$, $27_2$, . . . , etc., of said gaps 20.

In such a belt of the invention, the center of gravity lying in the radial plane P of the belt is close to the neutral axis in traction, which is situated level with the cords 16, thereby providing the advantage of a considerable increase in stability of the teeth 13 in the transverse plane P' compared with prior art embodiments.

This stability is further improved by a suitable choice of the distance between each tooth 13 and the facing free edges of two adjacent reinforcing members, e.g. the edge $30_1$ of flank $23_1$ of reinforcing member $21_1$ and the edge $31_2$ of flank $22_2$ of reinforcing member $21_2$. When this distance as measured in the longitudinal direction of the belt and marked x in FIG. 1 is small, then the elastomer matrix is less deformable than it would be if the distance were larger, thereby enabling the characteristics of the belt to be established correspondingly.

In the embodiment shown in FIG. 2, the reinforcing members in each gap are constituted by a fold 21 which is relatively short in extent and which therefore lines only a relatively small portion of the corresponding gap 20 in the belt.

In the embodiment shown in FIG. 3, each gap is lined with two reinforcing members in the form of two superposed folds 32 and 33 of substantially the same length and shape, with the flanks of the folds being disposed parallel to each and substantially parallel to the outline of the gaps between the teeth of the belt. This increases the stiffness of the belt and contributes to greater stability for the teeth in the radial plane, without spoiling the longitudinal flexibility of the belt.

In the embodiment of FIG. 4, which is similar to that described immediately above, the reinforcing members are disposed in the form of pairs of folds 35 and 36 lying in each of the gaps 20 between the teeth, and lying parallel to each other and to the outlines of the gaps, however the flanks of the inner fold 36 are longer than those of the outer fold 35.

In the embodiment of FIG. 5, the belt 40 has individual reinforcing members 41 each constituted by a single fold but with the free edges of each of the flanks 42 and 43 of each reinforcing member no longer being simple in shape but being rolled or partially folded back as shown at 44 and 45, with said rolled or folded-back edges advantageously extending outwardly relative to the curvature of the right cross-sections of the reinforcing members.

In FIG. 6, each of the gaps 20 in the belt 50 is provided with a reinforcing member 51 analogous to that described with reference to FIG. 1, however the invention further provides for each of the teeth 52 to receive an insert 60 disposed between the free edges 53 and 54 of the facing flanks 55 and 56 respectively of two adjacent reinforcing members, with said insert 60 being, for example, in the form of a strip or a plate of plastic material extending substantially transversely relative to the belt. By reducing the thickness of the elastomer material in the zone between the edges 53 and 54 of two adjacent reinforcing members, the stability of the teeth of the belt is increased in a radial plane.

A belt in accordance with the invention is manufactured in a manner analogous to that used for a conventional toothed belt and as a result it does not suffer from significantly increased expense which could hinder industrial exploitation of the invention.

We claim:

1. A power transmission toothed trapezoidal belt comprising a body constituted by an elastomer matrix having a layer of metal cables or of natural or synthetic material textile cords embedded therein for the purpose of providing strength in traction, and having reinforcing members with curved sections interconnected by arches embedded therein extending substantially transversely relative to the belt, each reinforcing member having a cross-section which is substantially "open" in shape and being trough- or gutter-shaped, wherein said reinforcing members are individual reinforcing members which are independent from one another, and wherein said reinforcing members are disposed in gaps between adjacent teeth of the belt.

2. A belt according to claim 1, wherein the individual reinforcing members are disposed in the form of a single fold in each gap between teeth of belt with flanks of reinforcing members running substantially parallel to outlines of gaps and with arches of reinforcing members running substantially parallel to the bottom of the gaps.

3. A belt according to claim 2, wherein the reinforcing members extend only in the vicinity of the bottoms of the gaps between the teeth and thus extend only over a small portion of the spans of said gaps.

4. A belt according to claim 1, wherein the reinforcing members are disposed in the form of folds which are parallel to each other and which are substantially parallel to the outlines of the gaps between the teeth in the belt.

5. A belt according to claim 3, wherein the folds are of different lengths.

6. A belt according to claim 3, wherein the folds are of substantially the same length and of substantially the same span.

7. A belt according to claim 1, wherein flanks of reinforcing members extend substantially over the major portion of the height of the teeth.

8. A belt according to claim 1, wherein free edges of flanks of two adjacent reinforcing members are substantially at the same level as each other.

9. A belt according to claim 1, wherein the free edges of the flanks of the reinforcing members are rolled or partially folded down.

10. A belt according to claim 1, further including an insert disposed in each of its teeth between the facing edges of the flanks of two adjacent reinforcing members.

11. A belt according to claim 10, wherein each of said inserts is in the form of a strip or bar of plastic material or the like.

12. A belt according to claim 1, wherein the reinforcing members are made of a material selected from the group constituted by: stainless steel; aluminum; an aluminum alloy; a copper alloy; a material based on synthetic resin optionally reinforced by natural and/or synthetic fibers; and composite materials such as laminates including natural and/or synthetic fiber cloth, an elastomer, and metal sheet.

* * * * *